June 12, 1923.
C. W. BECK
1,458,608
FLEXIBLE COUPLING
Filed Feb. 19, 1917
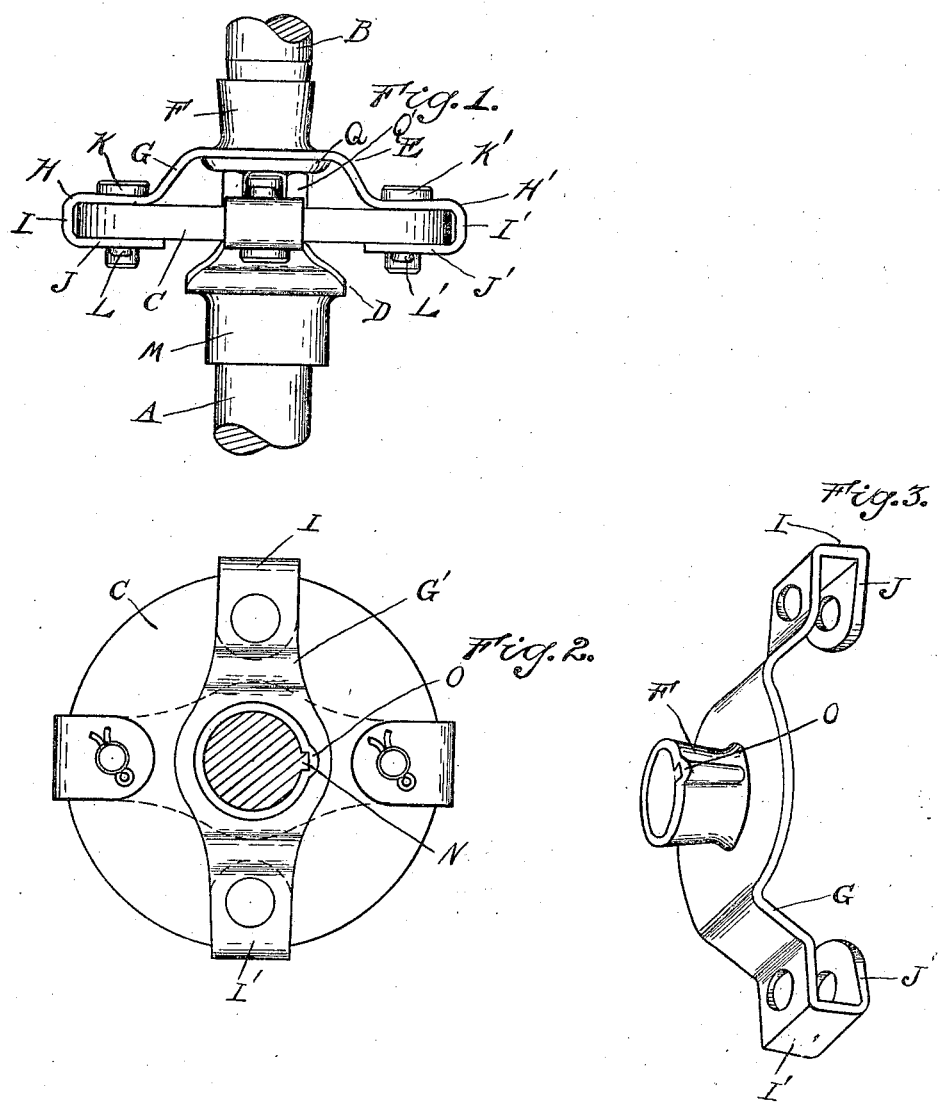
Inventor
Charles W. Beck
By Whittemore Hulbert & Whittemore
Attorneys Patented June 12, 1923.

1,458,608

UNITED STATES PATENT OFFICE.

CHARLES W. BECK, OF DETROIT, MICHIGAN.

FLEXIBLE COUPLING.

Application filed February 19, 1917. Serial No. 149,514.

*To all whom it may concern:*

Be it known that I, CHARLES W. BECK, a citizen of the United States of America, residing at Detroit, in the county of Wayne and State of Michigan, have invented certain new and useful Improvements in Flexible Couplings, of which the following is a specification, reference being had therein to the accompanying drawings.

This invention relates to flexible couplings for shafts and refers more particularly to an improved flexible coupling of the type in which a plate or disc of thermoid or other hardy flexible material is employed to permit the shafts to have a certain degree of play to compensate for error in alignment.

The main object of the invention is to provide a construction in which the mounting members for the flexible disc or plate can be formed at low cost from stamped metal; to utilize a construction having spider arms provided with return-bent ends for mounting the flexible disc or plate with reference to the drive and driven portions of the shaft; to provide a construction suitable for use in magneto shafts, pump shafts or the like; and in general to provide an improved and simplified construction of the character above referred to.

In the drawings:

Figure 1 is a side elevation of a flexible coupling embodying my invention;

Figure 2 is a cross section through one of the shafts looking toward the coupling.

Figure 3 is a perspective view of one of the spider members.

In general the flexible coupling comprises the disc or plate C of thermoid or other tough flexible material interposed between the driving shaft or portion A and the driven shaft or portion B and connected thereto by members D and E. In detail the connecting member E comprises a head portion F engageable with the shaft B and a spider member G having arms H and H'. These arms are return-bent at I and I' to provide bearing portions J and J' on the opposite side of the flexible disc C. For fastening the spider arms to the disc, the arms are provided with suitable apertures through which project bolts K and K' each secured in place by suitable cotter pins L and L'.

The member D has a head portion M secured on the shaft A and a spider member G' having return-bent ends I and I' similar to the arms H and H' of the member E. The arms of the spider G' extend transversely to those of the spider member G and are secured to the flexible disc C by bolts and cotter pins in the manner described in connection with the spider member G. In certain cases for manufacturing purposes it is desirable to form the two spider members of the same size and shape so that they can be used interchangeably, although positioned in the opposite directions as shown in Figure 2. The spider members or clips G and G' are formed with integral stamped heads F and M which are secured non-rotatably to the respective shafts A and B by any suitable means. In the particular construction shown the head M is secured to the shaft A by means of a projection N on the shaft which interlocks with the recessed seat O formed in the head of the clip member. The shaft B, however, has a screw threaded outer end portion which also projects through the clip member sufficiently to receive a washer Q and lock nut Q'.

A flexible coupling constructed as above described will efficiently couple the shafts together, while permitting a limited movement out of axial alignment and can be constructed and assembled at a minimum cost.

Various changes, however, can be made in the details of construction within the scope of my invention.

What I claim as my invention is:

1. In a flexible coupling, the combination with shafts arranged end to end, of a flexible member, and connections between said flexible member and said shafts, comprising sheet metal members secured to the shafts and having return-bent ends extending over the flexible member and fixedly secured thereto.

2. In a flexible coupling, the combination with shafts, of a flexible member having a connection with one of said shafts, and a connection between said flexible member and the other shaft comprising a clip member having a return-bent end fixedly secured to the flexible member.

3. In a flexible coupling, the combination with a longitudinally extending member, of a flexible member, and connections between said flexible member and longitudinally extending member, one of said connections comprising a member secured to one of the longitudinally extending members and having return-bent ends extending over the flexible member and fixedly secured thereto.

4. A drive connection between a disc and shaft comprising a sheet metal stamping formed with a central hub for embracing said shaft and with a plurality of radial arms, return bent at their extremities to embrace said disc.

In testimony whereof I affix my signature.

CHARLES W. BECK.